(12) United States Patent
Finnsson

(10) Patent No.: US 11,883,975 B2
(45) Date of Patent: Jan. 30, 2024

(54) CUTTING APPARATUS FOR CUTTING FOOD ITEMS CONVEYED ON A CONVEYOR INCLUDING AT LEAST ONE CONVEYOR BELT

(71) Applicant: MAREL ICELAND EHF, Gardabaer (IS)

(72) Inventor: Thorir Finnsson, Kopavogur (IS)

(73) Assignee: MAREL ICELAND EHF, Gardabaer (IS)

( * ) Notice: Subject to any disclaimer, the term of this patent is extended or adjusted under 35 U.S.C. 154(b) by 16 days.

(21) Appl. No.: 16/882,223

(22) Filed: May 22, 2020

(65) Prior Publication Data

US 2020/0282585 A1    Sep. 10, 2020

Related U.S. Application Data

(63) Continuation of application No. 14/381,069, filed as application No. PCT/EP2013/054743 on Mar. 8, 2013, now abandoned.
(Continued)

(30) Foreign Application Priority Data

Mar. 8, 2012  (EP) .................................. 12001608

(51) Int. Cl.
*B26D 5/34*    (2006.01)
*B26D 1/04*    (2006.01)
(Continued)

(52) U.S. Cl.
CPC .............. *B26D 5/34* (2013.01); *A22C 17/002* (2013.01); *A22C 17/0006* (2013.01);
(Continued)

(58) Field of Classification Search
CPC .............................. B26D 5/34; Y10T 83/4961
See application file for complete search history.

(56) References Cited

U.S. PATENT DOCUMENTS

| 1,820,301 A | * | 8/1931 | Delamere | ............... C11D 13/22 |
|---|---|---|---|---|
| | | | | 83/401 |
| 3,350,970 A | | 11/1967 | Glastra | |
| 4,092,889 A | | 6/1978 | Fisher | |
| 4,186,632 A | * | 2/1980 | Leslie | ................... B26F 1/3813 |
| | | | | 83/13 |

(Continued)

FOREIGN PATENT DOCUMENTS

GB         2364894 A  *  2/2002  ............... B26D 3/10

*Primary Examiner* — Ghassem Alie
*Assistant Examiner* — Samuel A Davies
(74) *Attorney, Agent, or Firm* — Workman Nydegger

(57) ABSTRACT

This invention relates to a cutting apparatus for cutting food items conveyed on a conveyor including at least one conveyor belt. A cutter is arranged above a gap extending across the at least one conveyor belt. The cutter is positioned in relation to the gap such that the cutting path of the cutter extends through the food items and the gap and below the surface level of the at least one conveyor belt. The cutter is adapted to be connected to a control mechanism for operating crosswise movement of the cutter along the gap. The gap is formed between adjacent elongated supporting means such as rollers with a fixed internal arrangement, where the adjacent elongated supporting means and the cutter is adapted to be connected to a control mechanism for operating back and forth movement of the adjacent elongated supporting means and the cutter parallel to the conveying direction while maintaining the internal arrangement of the adjacent elongated supporting means and the cutter fixed.

25 Claims, 14 Drawing Sheets

Related U.S. Application Data

(60) Provisional application No. 61/624,563, filed on Apr. 16, 2012.

(51) Int. Cl.
  *B26D 5/00* (2006.01)
  *B26D 7/06* (2006.01)
  *B26D 7/18* (2006.01)
  *B26F 3/00* (2006.01)
  *A22C 17/00* (2006.01)
  *B65G 15/28* (2006.01)
  *B65G 15/00* (2006.01)

(52) U.S. Cl.
  CPC ...... *A22C 17/0086* (2013.01); *A22C 17/0093* (2013.01); *B26D 1/04* (2013.01); *B26D 5/007* (2013.01); *B26D 7/0625* (2013.01); *B26D 7/18* (2013.01); *B26F 3/004* (2013.01); *B65G 15/28* (2013.01); *B65G 15/00* (2013.01); *Y10T 83/145* (2015.04); *Y10T 83/242* (2015.04); *Y10T 83/364* (2015.04); *Y10T 83/4691* (2015.04)

(56) References Cited

U.S. PATENT DOCUMENTS

| | | | |
|---|---|---|---|
| 4,501,182 A * | 2/1985 | Jardat | B26D 7/20 |
| | | | 83/177 |
| 4,728,379 A | 3/1988 | Audi et al. | |
| 4,735,566 A | 4/1988 | Squicciarini | |
| 4,875,254 A * | 10/1989 | Rudy | A22C 17/002 |
| | | | 452/157 |
| 4,962,568 A | 10/1990 | Rudy et al. | |
| 5,201,258 A * | 4/1993 | Cremona | B23D 47/025 |
| | | | 83/155 |
| 5,371,999 A | 12/1994 | Hansen et al. | |
| 6,640,682 B2 | 11/2003 | Wagner et al. | |
| 7,841,264 B2 | 11/2010 | Kim et al. | |
| 8,028,977 B2 * | 10/2011 | Blaser | B23K 7/10 |
| | | | 269/21 |
| 2002/0067797 A1 | 6/2002 | Safai et al. | |
| 2005/0032471 A1 | 2/2005 | Pfarr et al. | |
| 2005/0085176 A1 * | 4/2005 | Houtz | A22C 17/0046 |
| | | | 452/157 |
| 2006/0288833 A1 | 12/2006 | Lachance | |
| 2008/0060916 A1 | 3/2008 | Whittlesey | |
| 2008/0276777 A1 | 11/2008 | Blaine et al. | |
| 2009/0217793 A1 | 9/2009 | Spillner et al. | |

* cited by examiner

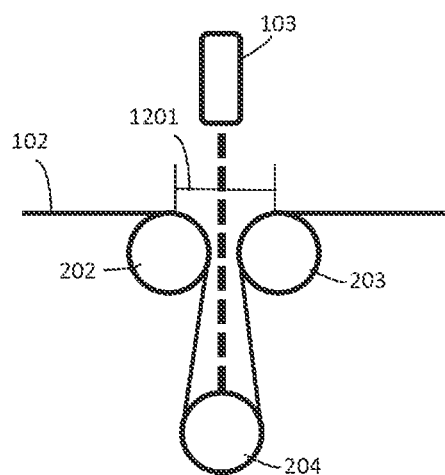 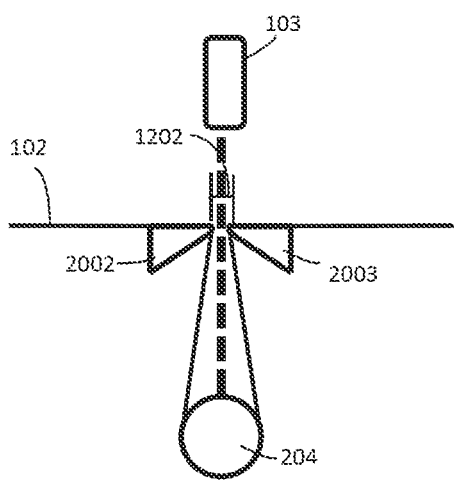
FIG. 12a  FIG. 12b
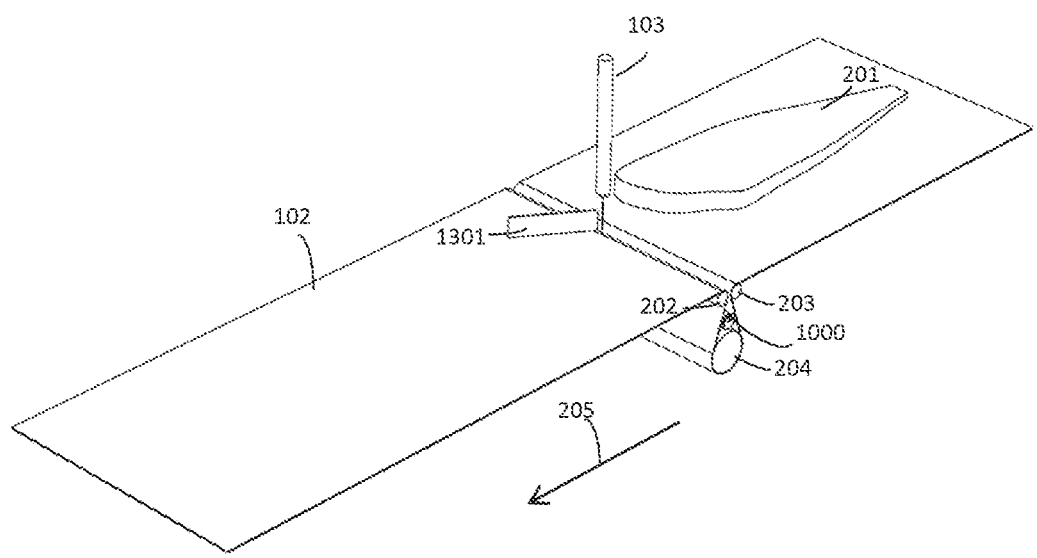
FIG. 13

CUTTING APPARATUS FOR CUTTING FOOD ITEMS CONVEYED ON A CONVEYOR INCLUDING AT LEAST ONE CONVEYOR BELT

CROSS-REFERENCES TO RELATED APPLICATIONS

This application is a continuation of U.S. application Ser. No. 14/381,069, which is the national phase of International Application No. PCT/EP2013/054743 filed on Mar. 8, 2013, which claims the benefit of priority to European Patent Application No. EP 12001608.4 filed on Mar. 8, 2012 and U.S. Patent Application No. 61/624,563 filed on Apr. 16, 2012. The entire disclosures thereof are incorporated herein by reference.

FIELD OF THE INVENTION

The present invention relates to a cutting apparatus for cutting food items conveyed on a conveyor including at least one conveyor belt and further to a food processing system comprising such cutting apparatus.

BACKGROUND OF THE INVENTION

Undesired objects such as tissues or bones in food items such as fish fillets, poultry fillets and meat may be removed in an automatic way via cutting, where the cutting is performed in accordance to images taken of the food items that identify the locations of the tissues/bones to be cut and removed. Today, the food items are often moved or placed on a first conveyor that may include a thin solid belt where the imaging, e.g. x-ray imaging, takes place while the food items are being conveyed. Since the cutting involves implementing cutting procedure such as high pressure water jet that extends below the surface of the conveyor belt the objects must me moved onto a special cutting belt, typically a stainless steel conveyor belt, that will not be damaged during the cutting. A tracking mechanism is implemented for tracking the position of the food item pieces at all times during the conveying. The movement between the two conveyors can easily result in an inaccuracy in the displacement of the food items at the interface between the two conveyors so that the tracking of the food items becomes less reliable. Such errors have been corrected up to some extent in WO20 11 095998 by providing a second image data when the food items are positioned on the cutting conveyor and compare this second image data with the first image data by utilizing the tracking position, i.e. the second image data is compared to the expected position of the food items. In case of non-match between the first and second image data, the x-ray image data are mapped onto the second image data such that the position of the tissued matches to the second image data, and the cutting process is then based on the mapped image data.

There are however several disadvantages involved in using such two separate conveyors such as that the whole apparatus including this imaging section and the cutting section can be very spacious and costly. Also, transferring the food items from the x-ray conveyor towards the cutting conveyor does always, despite the solution described in W02011095998, result in some inaccuracy and is also costly since a second imaging mechanism is required. Further, the cutter belt is made of multiple of small stainless steel modules that are connected via hinges which makes the cleaning of the belt more difficult compared to the above mentioned thin solid belt.

N0176343 discloses a machine for cutting fish fillet while these are supported on a conveying surface on a conveyor belt comprising a frame which can move linearly in the conveyor belt's direction of movement and which is arranged to support a cutting element at a level above the conveying surface. The conveyor belt is so arranged, in conjunction with the frame, that it runs in a largely V-shaped path, lateral to the conveying surface of the conveyor belt to form a gap-shaped depression in the conveyor belt's conveying surface. A guide roller, seated in a rotation fashion in the frame and running laterally to the conveyor belt at a level below the conveying surface, supports the conveyor belt at the bottom section of the V-shape belt. The frame is so constructed that the internal arrangement between the vertical plane through the cutting element's longitudinal axis and the vertical plane throught the guide roller are shifted away from each other such that the V-shaped profile is askew in relation to the vertical plane through the cutting element's longitudinal axis. This means that if the cutting means is not a knife blade but waterjet cutter or other relevant jet cutter it is possible to use narrow gap.

A collection channel may be disposed at arbitrary levels in the depression for preventing offcuts and any cutting fluid from forming an obstruction at the guide roller. In this embodiment it is preferred that the collection channel is disposed in the upper section of the depression. The reason for this is that due to the oblique relation between the U-shaped profile and the vertical plane through the cutting element's longitudinal axis the collection channel can constitute a protection for the conveyor belt in the cutting area so as to prevent the cutting element damaging (cutting into) the conveyor belt.

The drawback with this cutting machine is how complex it is, especially when cutting tools such as watetjet are being implement instead of cutting blades.

Moreover, there is no support for the conveyer belt except the tension in the conveyor belt created between the drive roller and the reversing roller of the cutting machine. However, the conveyor belt will always be deflected from it's initial two dimensional planar surface arrangement when food items are present and are being conveyed on the conveyor belt, where the more heavier the food items are the more will this deflection be. Such a deflection, e.g. between the drive roll and the U-shaped gap, is obviously reflected in less accurate cutting because the position of the food items in relation to the cutting means will always be shifted. Such an inaccuracy may be avoided up to some extent via arrangement in the reversing roller for regulating the tension in the belt, but such an increase in the tension may affect the back and fort movement of the frame comprising the cutting means.

Also, the length of the apparatus will always be limited because of the lack of support for the conveyor belt. This means that it can be difficult or even impossible to implement this apparatus in relation to further apparatus e.g. as any types of imaging equipments such X-ray machines where it is important the such imaging equipments are associated with the same conveyor belt as the conveyor belt of the cutting machine.

The inventor of the present invention has appreciated that there is thus a need for a simplified and more efficient cutting apparatus and food processing system and has in consequence devised the present invention.

SUMMARY OF THE INVENTION

It would be advantageous to achieve an improved and more efficient and precise cutting apparatus and a food processing system. In general, the invention preferably seeks to mitigate, alleviate or eliminate one or more of the above mentioned disadvantages singly or in any combination. In particular, it may be seen as an object of the present invention to provide a cutting apparatus that solves the above mentioned problems, or other problems, of the prior art.

To better address one or more of these concerns, in a first aspect of the invention a cutting apparatus is provided for cutting food items conveyed on a conveyor including at least one conveyor belt, comprising:

a cutter arranged above a gap extending across said at least one conveyor belt, the cutter being positioned in relation to the gap such that the cutting path of the cutter extends through the food items and the gap and below the surface level of said at least one conveyor belt, the cutter being adapted to be connected to a control mechanism for operating crosswise movement of the cutter along said gap, wherein said gap is formed between adjacent elongated supporting means with a fixed internal arrangement, the adjacent elongated supporting means and the cutter being adapted to be connected to a control mechanism for operating back and forth movement of the adjacent elongated supporting means and the cutter parallel to the conveying direction while maintaining said internal arrangement of the adjacent elongated supporting means and the cutter fixed.

Accordingly, in case that the imaging equipment is a x-ray machine, there is no longer need for using two separate conveyors, i.e. one as a x-ray conveyor and one as a cutting conveyor since one and the same conveyor may be used for both conveying the food items during imaging and also during cutting. Thus, any errors in the displacement of the items and thus in the cutting due to the transferring between x-ray conveyor and cutting conveyor has been eliminated. Also, the cutting may take place on a thin solid belt instead of e.g. a stainless steel conveyor. This has several advantages such as easier cleanability of the belt compared to such steel belts that they have alot of hinges and the like. Also, the costs relating to using such belts is typically much lower compared to such cutting belts. Further, similar type of belt may be implemented for this cutting apparatus as in the remaining conveyors in the food processing system which results in e.g. lowers costs. Additionally, the food items may be imaged at all times, e.g. shortly before the cutting starts and also during the cutting, but such an imaging, e.g. x-ray imaging, is not possible on a such cutting belts. The apparatus thus facilitates that monitoring of the cutting compared to said prior art cutting apparatus that uses stainless steel belts.

In one embodiment, said conveyor further comprises at least one supporting means arranged adjacent and below said conveyor belt for providing a support for said conveyor belt.

In one embodiment, said at least one supporting means comprises at least one supporting belt extending between a first roller means and a second roller means roller means.

Accordingly, a support is provided for the conveyer belt which prevents the conveyor belt from being deflected when food items are conveyed on it meaning that any kind of inaccuracy in cutting is no longer present because the position of the food items in relation to the cutting means will always be the same. Thus, extra arrangement for maintaining sufficient tension in the conveyor belt is not needed. This also means that the conveyor can be significantly longer than such prior art conveyor where such a V-shaped gap arrangement is utilized. The at least one supporting means may further include any means that is arranged parallel to the conveying direction and below said conveyor belt and/or transversally to the conveying direction. The supporting means may also include, but is not limited to, telescopic bars arranged longitudinal below the main conveyor belt, and/or number of transversal bars arranged transversal to the transport direction that can be pushed together and pulled apart arranged below said conveyor belt.

In one embodiment, said at least one supporting belt has a first end mounted to a downstream side of a frame structure for maintaining said internal arrangement of the adjacent elongated supporting means fixed, and a second end mounted to an upstream side of said frame structure.

In one embodiment, where the first end of the at least one supporting means extends from the downstream side of said frame structure and around a first elongated bar to the first roller and the second end of the at least one supporting means extends from the upstream side of said frame structure and around a second elongated bar to the second roller means.

In one embodiment, said at least one of said first roller and said second roller is a driving roller for providing back and forth displacement of the frame structure via said at least one supporting belt. In that way, a simple solution is provide to operate the back and forth movement of said adjacent elongated supporting means, and said at least one further elongated supporting means and the cutter parallel to the conveying direction while maintaining said internal arrangement fixed. The at least one supporting belt does not necessarily have to extend around the first and the second roller means, i.e. so that the at least one support belt forms in a way at least one endless-like belt. The at least one support belt however typically extends around said first and second roller means and in that way form a kind of an endless-like belt.

In one embodiment, said conveyor further comprises a third roller means and a fourth roller means placed distally away from said first and second roller means, where at least one of said third or fourth roller means act as a driving roller means for said conveyor belt. In that way, said means that maintains the internal arrangement of said adjacent elongated supporting means, said at least one further elongated supporting means and said cutter parallel to the conveying direction fixed during use, is operated independently of the conveyor belt.

In one embodiment, the cutting apparatus comprises at least one further elongated supporting means placed below said adjacent elongated supporting means, said at least one conveyor belt being a single conveyor belt and said adjacent elongated supporting means and said at least one further elongated supporting means being adapted to create a bypass for said conveyor belt by means of extending the conveyor belt between the adjacent elongated supporting means and said at least one further elongated supporting means such that a substantial V-shaped profile of the conveyor belt is formed. Accordingly, a simple solution is provided to provide said opening for the cutter. The at least one further elongated supporting means may e.g. be an idle roller that is placed directly below the cutter, but by placing it in the cutting plane it is ensured that the belt/conveyor will not be damaged during the cutting because the cutting tool, e.g. a water jet and the like, will never intersect with the conveyor belt. Also, that fact that a single conveyor belt is being used makes the apparatus both more economical and simpler.

The internal arrangement between the adjacent elongated supporting means and the at least one further elongated supporting means may be such that the V-shaped profile may be oblique in relation to the surface of the conveyor belt, i.e. such that the at least one further elongated supporting means does not lie directly below the cutting means and in the cutting plane, or as mentioned above, such that the at least one further elongated supporting means is directly below the cutting means.

In one embodiment, said elongated supporting means is adjustable from being in a closed position where it is placed in a lowest position in relation to said adjacent elongated supporting means where the conveyor belt is in a stretched state towards being in an unlocked position where the conveyor belt is in a slack state. By moving the elongated supporting means from said closed position where it is positioned below said adjacent elongated supporting means towards said open position towards the rollers or above the rollers, the conveyor belt may easily be removed for e.g. cleaning purposes or for replacing it with a new belt.

In one embodiment, said elongated supporting means are rollers. In another embodiment, said adjacent elongated supporting means are triangular shaped bars where the acute angles of said triangular shaped bars are facing each other. The advantage of using rollers compared to the triangular shaped bars is that the wear on the conveyor belt is less which increases the lifetime of the belt, and also the friction is less meaning that less power is required to operate it. On the other hand, the advantage of using such triangular shaped bars is that the active distance between the distal ends of said adjacent triangular shaped bars can be shorter compared to rollers, which may be favorable if the food items are relatively short.

In one embodiment, said acute angle of said triangular shaped bars have a round shape. This is to provide a "smooth" interaction between the conveyor belt and the triangular shaped bars but the more sharper the acute angles are the higher is the risk that the conveyor belt becomes damaged.

In one embodiment, the cutting apparatus further comprises elongated bar arranged below the surface level of said at least one conveyor belt between said at least one further elongated supporting means and said cutter, the elongated bar being positioned such that it intersects with the cutting plane of the cutter at all times. In one embodiment, said elongated bar is a tube with a slot extending along the longitudinal axis of the tube and where the tube is positioned such that the slot is facing the cutter and thus intersects with the cutting plane of the cutter at all times. Accordingly, the enormous impact from the cutter, e.g. if the cutter is a water cutter, onto the at least one further elongated supporting means is absorbed by said elongated bar, which may easily be replaced by a new one.

In one embodiment, the adjacent elongated supporting means are distal end-rollers of two adjacent conveyor belts each of which being provided with a belt stretching mechanism for maintaining a fixed belt tension at all times while maintaining said fixed internal arrangement of the adjacent rollers.

In one embodiment, said cutting apparatus further comprises a scraper adapted to remove cut out pieces of the food items after the cutting. It is namely of particular advantage to be able to remove the cut out pieces after the cutting on one and the same conveyor as where the cutting is taking place, but today, such an automatic removing is not possible on the stainless steel cutter belt that are being used due to their rough surface. Also, it is prevented that the cut out pieces/offcuts become accumulated in said gap, i.e. the V-shaped depression.

In one embodiment, said scraper is mounted to a scraper operating mechanism capable of moving the scraper down adjacent to the surface level of said at least one conveyor belt during cutting, and up from the surface level when not in use. In that way, and "active" mode and "non active" mode of the scraper is provided since some cuts may be such that an immediate removing is not possible.

In one embodiment, said scraper operating mechanism further comprises angle adjustment mechanism to adjust the angle of the scraper around vertical axis. This may be of particular advantage when e.g. trimming pork belly where the trimming is taking place at both sides of the pork belly. Thus, by adjusting the angle accordingly it is ensured that the automatic removing of the trim is guided away from the conveyor belt.

In one embodiment, the scraper is positioned adjacent and behind the cutter at the downstream end with respect to the conveying direction of the at least one conveyor belt. Accordingly, an immediate removal of the cut out portions) of said food items is possible. In one embodiment, the cut-off material may also can be removed by means of vacuum or suction means.

In one embodiment, the cutter is further provided with a tilting mechanism for adjusting the tilting angle in both directions within the cutting plane of the cutter. The cutter may be selected from, but is not limited to:
  a fluid pressure cutter,
  a laser beam cutter,
  a high pressurized gas cutter, or
  a cutting blade.

In one embodiment, said at least one further elongated supporting means comprises two spaced apart roller means. Accordingly, a space is created between the two spaced apart roller means for collecting off-cuts and the like that might fall down through said gap between said adjacent elongated supporting means.

In one embodiment, the cutting apparatus further comprises a removing means for removing undesired particles, off-cuts and the like from the gap extending across said at least one conveyor belt. Thus, means is provide to immediately remove any off-cuts, dirt, particles and the like that might e.g. fall onto the space between said spaced apart roller means and be pushed hard by the roller means onto the conveyor belt resulting in that they might otherwise stick firmly to the conveyor belt.

In a second aspect of the invention a food processing system is provided comprising said cutting apparatus, comprising:
  an imaging system for imaging and producing image data of the food items to be processed,
  a computer system operable connected to a tracing mechanism for tracing the position of the food items while being conveyed, the computer system being adapted to process said image data so as to generate operation parameters for operating said movement of the cutter across the conveyor belt and parallel to the conveying direction.

Accordingly, a food processing system is provided that may utilize a "unified" x-ray and cutting conveyor with the above mentioned advantages. This does not only make the system as such more compact but also enhances the accuracy in e.g. trimming since it is now possible to use a single conveyor meaning that the error caused when transferring the foot items from one conveyor to the next is no longer an issue.

In one embodiment, said imaging system is a x-ray system and where said image data is x-ray data. In another embodiment, said imaging system includes x-ray system positioned subsequent to cutting the food items adapted to image the processed food items, the image data subsequently being processed by said computer system so as to determined whether undesired objects are present in the processed food items.

In one embodiment, said imaging system is selected from:
a light source placed below/above the conveyor belt for imaging said food items and based thereon produce data identifying said undesired objects, or
a three dimensional imaging equipment, or
a color vision, or
a x-ray system, or
an ultraviolet system, or
a combination of one or more of the above.

In one embodiment, x-ray system includes a first x-ray beam for radiating the food items from a first viewing angle for generating a first view x-ray image data, and a second x-ray beam for radiating the food items from a second viewing angle for generating a second view x-ray image data, said first view and second view image data being utilized as input data in generating three dimensional image data based of said items.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which
FIGS. 12a and 12b depict two different embodiments of said adjacent elongated supporting means,
FIGS. 13-15 shows a perspective view of an embodiment of the apparatus according to the present invention further comprising a scraper adapted to remove cut out pieces of the food items immediately after the cutting.

DESCRIPTION OF EMBODIMENTS

Figure 1:
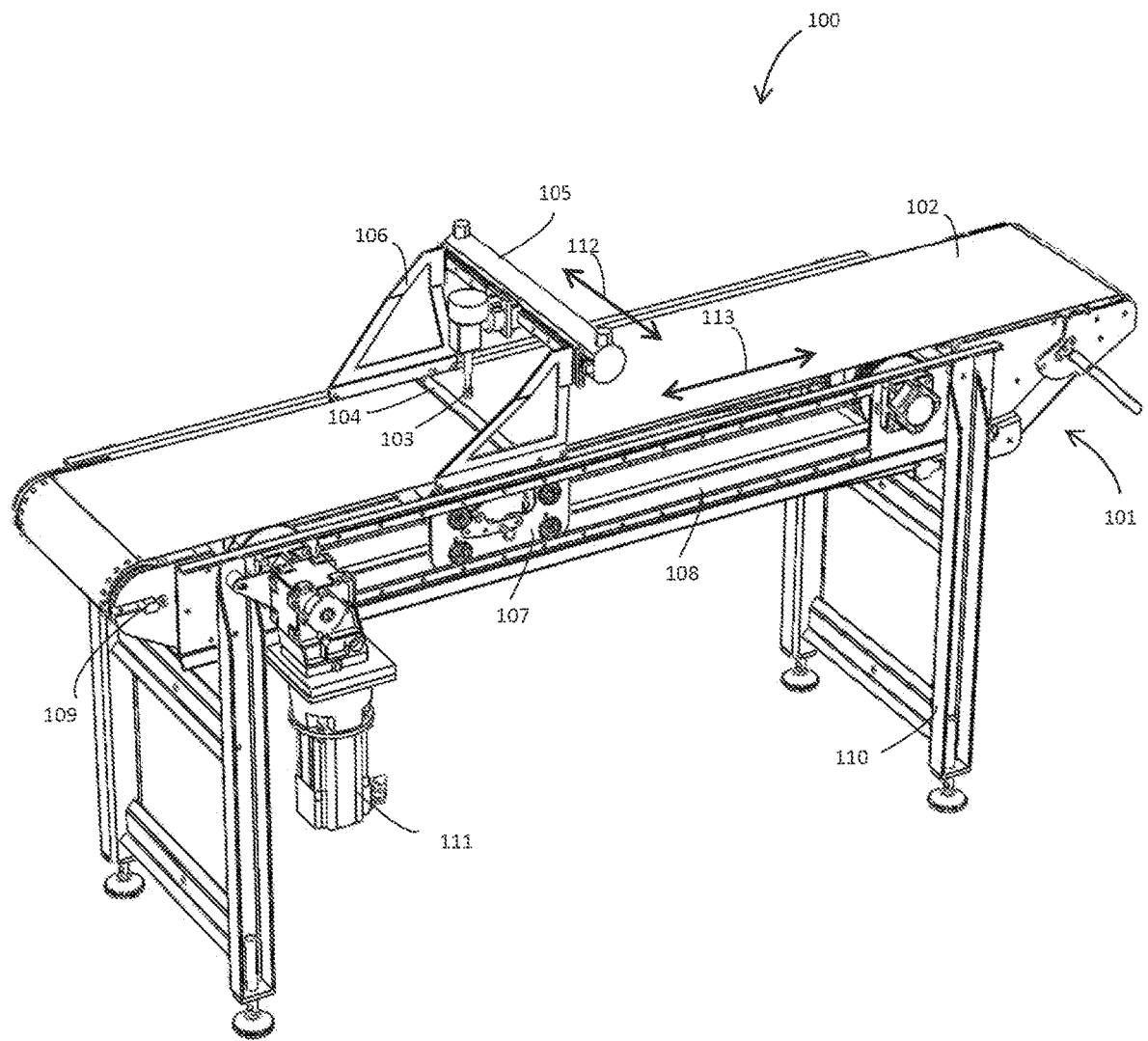
FIG. 1 shows a perspective view of an embodiment of a cutting apparatus according to the present invention for cutting food items.

FIG. 1 shows a perspective view of an embodiment of a cutting apparatus 100 according to the present invention for cutting food items conveyed on a conveyor 101 including a conveyor belt 102. The apparatus comprises a cutter 103 that is arranged above a gap 104 extending across the conveyor belt 102. The gap is formed between adjacent elongated supporting means such as adjacent rollers with a fixed internal arrangement. This will be discussed in more details in relation to the remaining figures. The conveyor belt 102 may be made of any type of deflecting material that may be of solid type such as any type of rubber or plastic material and/or any type of belt that is stiff in the transversal direction and flexible in the longitudinal direction such as an Intralox belt type.

The cutter may be, but is not limited to, a fluid pressure cutter, a laser beam cutter, a high pressurized gas cutter, or a cutting blade, where the cutter is slideable mounted to a track 105 positioned transverse and across the conveyor belt 102 directly above the gap 104 such that the cutting path of the cutter 103 extends through the gap 104 and below the surface level of the conveyor belt 102. The track may be an integral part of oppositely arranged supporting frames 106 for supporting the track and thus the cutter 103. The frames are mounted to vertical side plates 107 that are slideable mounted to opposite arranged tracks 108 parallel to the conveying direction. The cutter is operable connected to a control mechanism including a driving unit (not shown) for operating crosswise movement of the cutter along the gap 104 as indicated by the arrow 112. The cutter is further operable connected to a control mechanism including a driving unit 111 to operate back and forth movement of the adjacent elongated supporting means as indicated by the arrow 113 and the cutter parallel to the conveying direction while maintaining the internal arrangement of the adjacent elongated supporting means and the cutter 103 fixed, i.e. so that the cutter plane is at all times positioned directly above the opening 104. FIG. 1 shows further a conveyor motor 109 for running the conveyor belt, and a frame structure 110 for supporting the cutting apparatus.

In another embodiment and which will be discussed in more details in relation to FIGS. 28-29, the adjacent elongated supporting means, e.g. adjacent rollers, are distal endrollers of two adjacent conveyor belts each of which being provided with a belt stretching mechanism for maintaining a fixed belt tension at all times while maintaining said fixed internal arrangement of the adjacent rollers.

Figure 2:
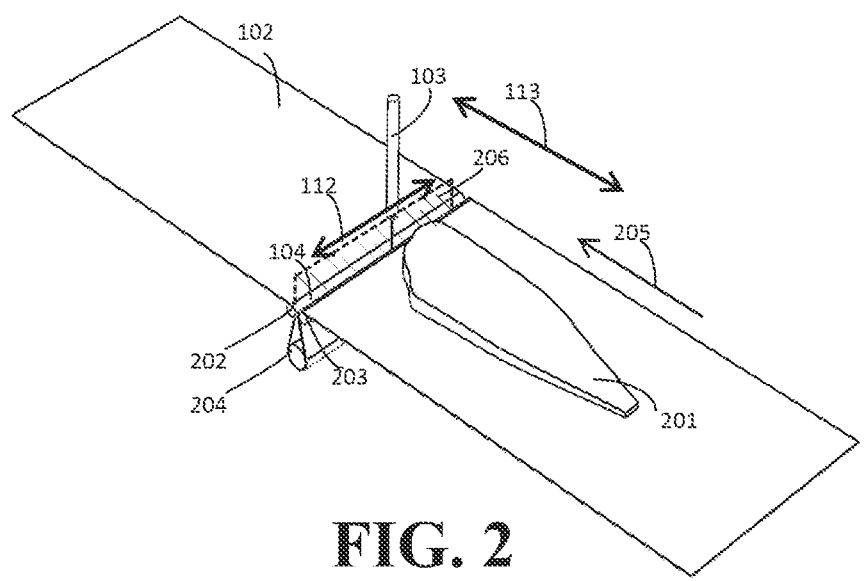
FIGS. 2-4 depict graphically a perspective view, top view and a side view of the cutting apparatus shown in FIG. 1,
FIGS. 5-7 depict graphically a perspective view, top view and a side view of the cutting apparatus in FIGS. 2-4 during cutting.
Figure 3:
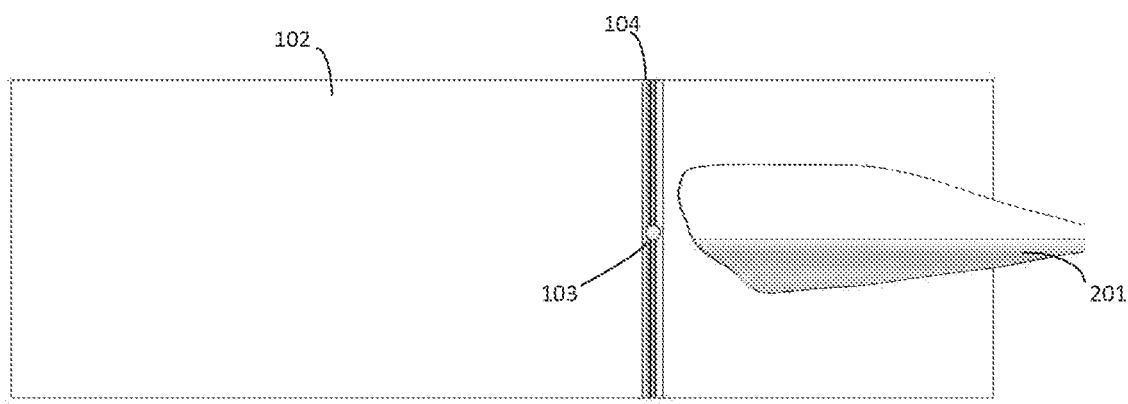
Figure 4:
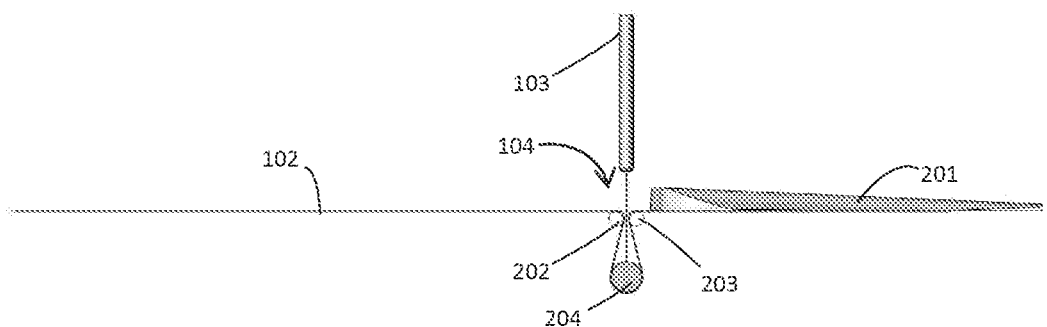

FIGS. 2-4 depict graphically a perspective view, top view and a side view of an embodiment of the cutting apparatus 100 shown in FIG. 1, where a single conveyor belt 102 is used and where the adjacent elongated supporting means 202, 203 are rollers. This should of course not be construed as being limited to rollers since any types of elongated supporting means that preferably have a smooth surface area for preventing the conveyor belt from being damaged may be implemented. In this embodiment, a further roller (elongated supporting means) 204 is provided and placed between and below the adjacent rollers 202, 203 such that it intersects with the cutting plane 206 of the cutter. As mentioned in relation to FIG. 1, the cutter may e.g. be a fluid pressure cutter meaning that this further roller must be made of material that can withstand the impact from the fluid pressure, such as a stainless steel. As shown here, the internal arrangement between the rollers 202-204 is such that the further roller 204 is positioned below the cutter 103 and thus intersects with the cutting planes 206 at all times. This arrangement of the rollers provides bypass for the conveyor belt 102 since the conveyor belt extends between the adjacent rollers 202, 203 and the further roller 204 such that a substantial U-shaped profile of the conveyor belt 102 is formed. The arrangement of the rollers 202-204 shown here may be considered as the position where the further roller 204 is in a closed position, i.e. where it is placed below the surface level of the adjacent roller 202, 203 and where the conveyor belt 102 is in a stretched state. The adjacent rollers 202, 203 may be rigidly mounted to the vertical side plates 107 (see FIG. 1), whereas the further roller 204 is also mounted to the side plates 107 but in a way that it is adjustable from being in a locked position, as shown here, to an unlocked position via an lock/unlock mechanism comprised in the side plates. By doing so, the further roller 204 is adjustable upwards so that the conveyor belt will be no longer be stretched, i.e. in a slack state. The conveyor belt may thus easily be removed from the cutting apparatus 100, e.g. for cleaning purposes or for replacing it with a new belt. Any types of conveyor belts may be used, e.g. thin solid belts made of plastic material or e.g. polyurethane, polyester and the like.

The conveying direction of the food item 201, in this case a fish fillet, is indicated by arrow 205. A typical procedure as will be discussed in more details in relation to FIG. 13 is following: an imaging apparatus such as an x-ray system, takes x-ray images of the fish fillet 201. The x-ray images are processed by a computer system including a processing unit which detects where e.g. undesired fat tissues and/or undesired objects such as bones are located. Based on this, cutting operation parameters are generated that operate both the back and forth movement of the cutter 103 across the conveyor belt 102 within the gap 104 as indicated by arrow 112, and also back and forth movement of the cutter parallel to the conveying direction as indicated by arrow 113. Accordingly, one and the same cutter is being used for performing a two dimensional cutting, i.e. it is capable of cutting while being moved back and forth parallel to the conveying direction as well as simultaneously being move transverse across the conveyor.

The rollers 202-204 and the track 105 shown in FIG. 1 may be mounted to a common frame structure, e.g. said supporting frames 106 and side plates 107, which is operable connected to a driving unit (not shown) that operate the back and forth movement of this frame structure and thus the back and forth movement of the cutter 103 where this back and forth speed may be larger or less than the speed of the conveyor belt 102. Accordingly, while the fish fillet 201 is being conveyed one and the same cutter can trim the periphery of the fish fillet 201 and also remove e.g. the bones from the fish fillet.

Figure 5:
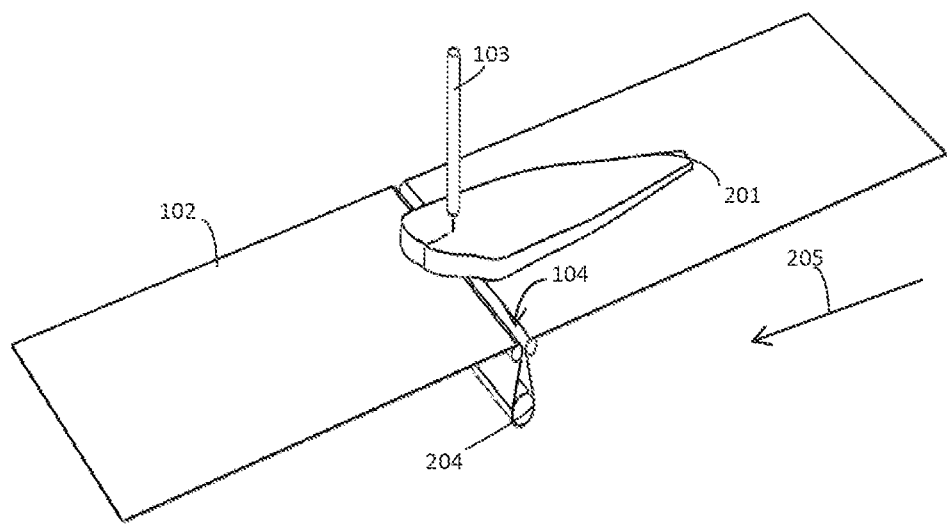
Figure 6:
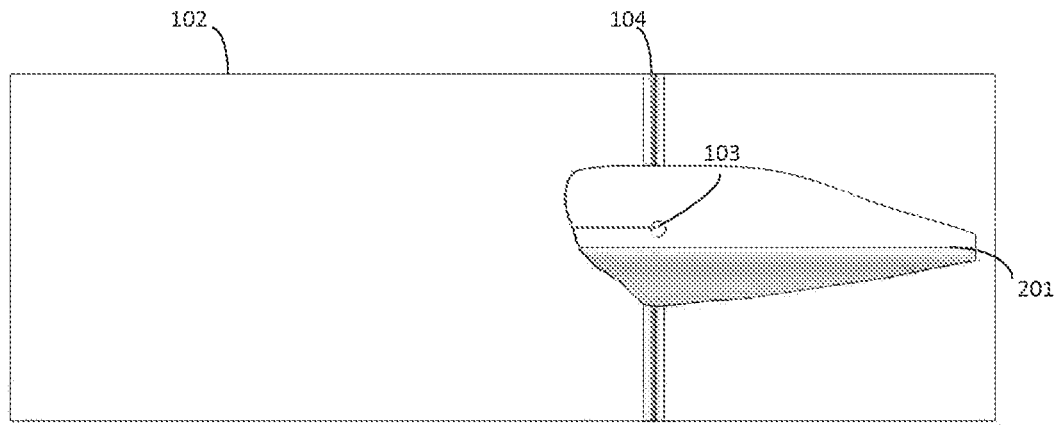
Figure 7:
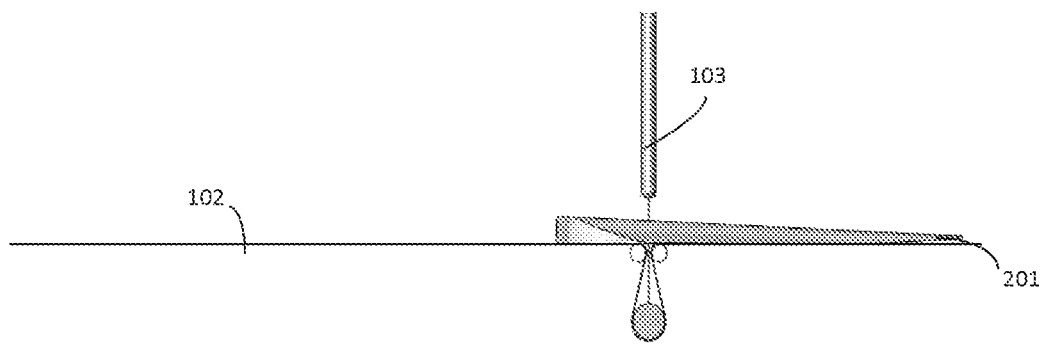
Figure 8:
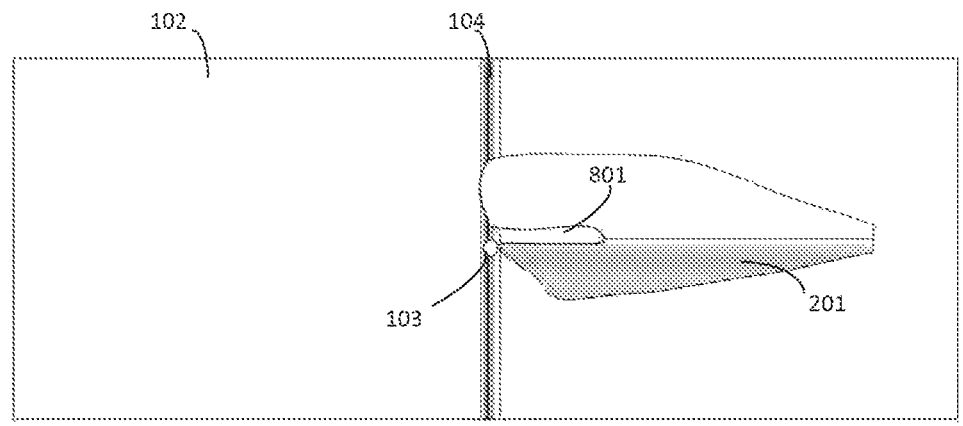
FIG. 8 depicts graphically a U-shaped cut out portion from a fish fillet.
Figure 9:
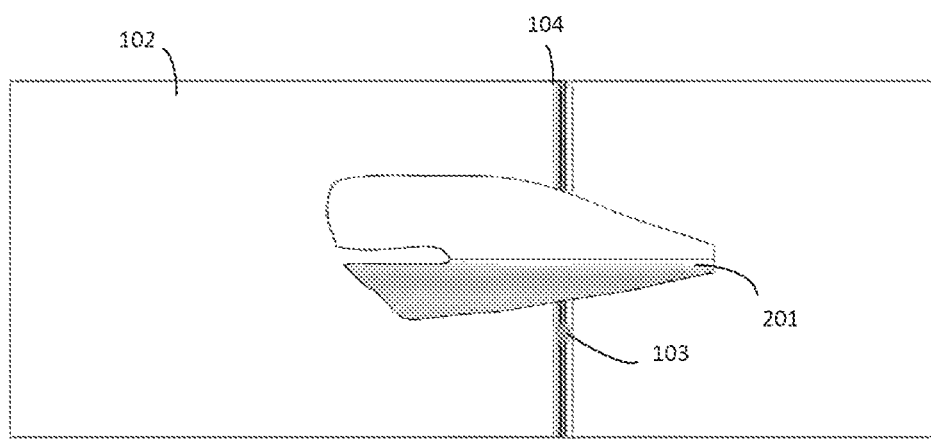
FIG. 9 shows where a cutter is moved sidewise across an opening for cutting other parts of the fish fillet.

FIGS. 5-7 depict graphically a perspective view, top view and a side view of the cutting apparatus in FIGS. 2-4, showing where a portion of the fish fillet 201 at the head end is being cut. In order to do so, the cutter moves first against the conveying direction 205 towards the tail end, and subsequently in the same direction as the conveying direction with a speed that is larger than that of the conveyor belt 102. The result is a substantial U-shaped cut out portion 801 as shown in FIG. 8, but as shown this portion has been removed from the fish fillet. FIG. 9 shows where the cutter 103 has moved sidewise across the opening 104 for cutting other parts of the fish fillet. The fluid pressure (or the laser beam, or the air pressure) is preferably also controllable at all times meaning that the e.g. the fluid pressure is adjustable from being in operation when cutting is taking place and shut off when no cutting is taking place, i.e. a kind of an on-off mode of the cutting is preferably fully operable. As an example, while the cutter is moving across the gap 104 the fluid pressure is shut off, and when the cutting is continued it is turned on.

In one embodiment, the cutter is further provided with a tilting mechanism (not shown) for adjusting the tilting angle within the cutting plane of the cutter.

The food items should of course not be construed as being limited to fish fillets, but this cutting apparatus may be of particular importance for cutting poultry items such as poultry breast, red meat and the like.

The cut out portiones) 801 may in one embodiment be removed with a vacuum or suction means. This may of particular importance when the cut out portiones) 801 are located a position, which as shown, is e.g. between the opposite sides of the fish fillet (or any food products) where it is not possible to scrape it away. As will be discussed later, if the cut out portions is at either sides of the food product (see e.g. FIG. 13-17) other means may be used to removed the cut out portions) from the conveyor belt 102.

Figure 10:
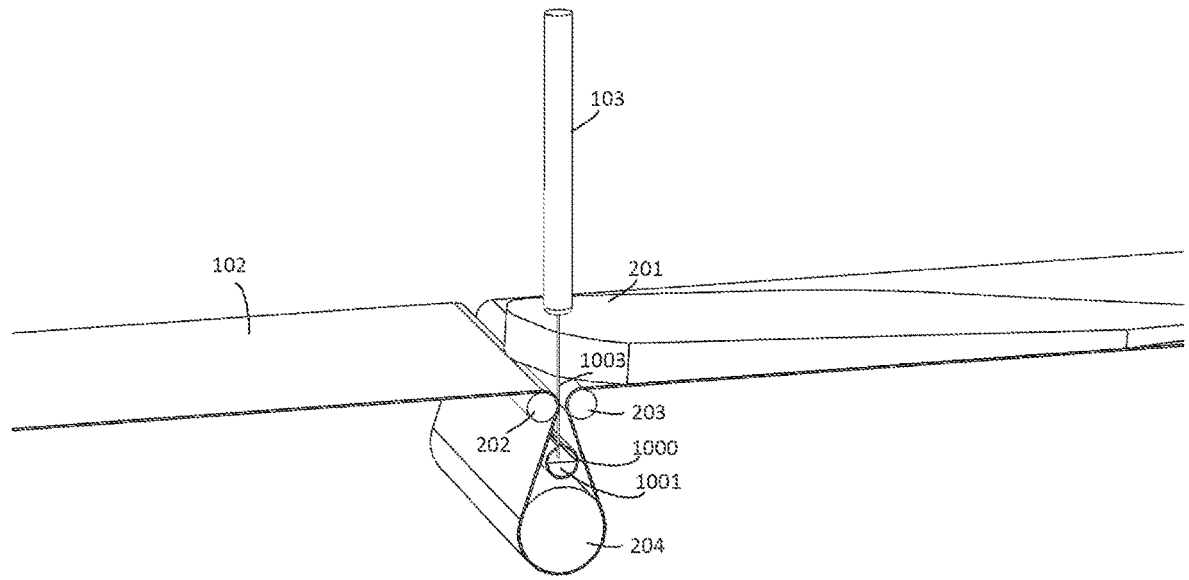
FIGS. 10 and 11 depict a perspective view and a side view of one embodiment according to the present invention, where adjacent elongated supporting means and the further elongated supporting means are rollers that create a bypass for the conveyor belt.
Figure 11:
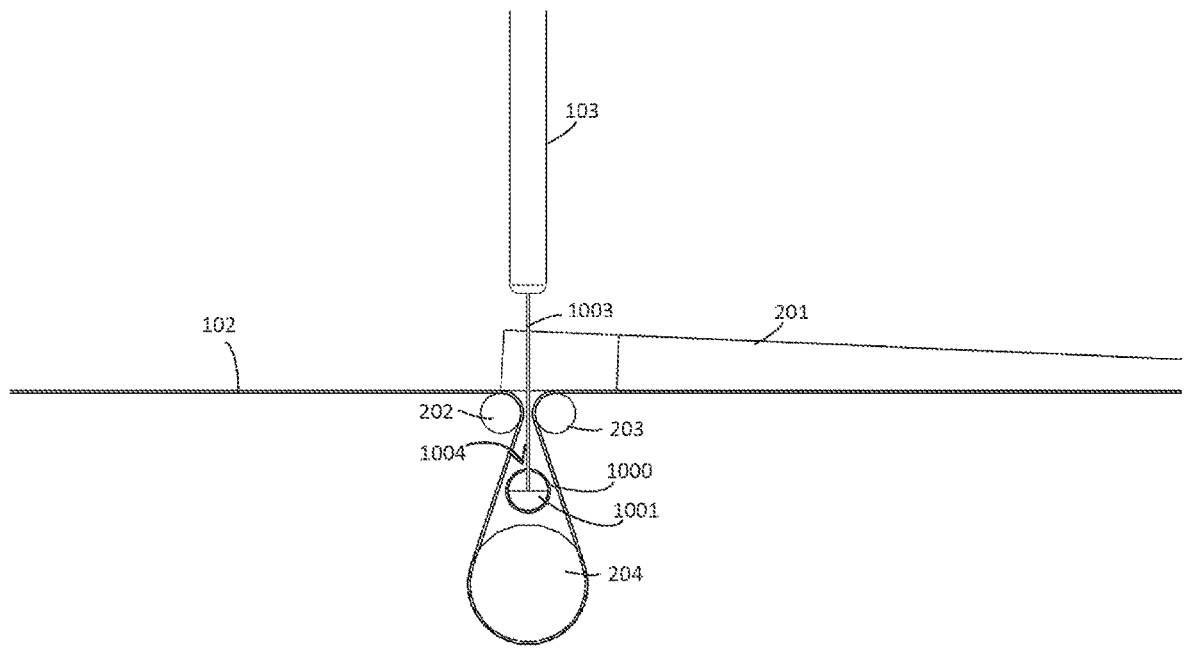

FIGS. 10 and 11 depict a perspective view and a side view of one embodiment of a cutting apparatus according to the present invention, where the adjacent elongated supporting means 202, 203 and the at least one further elongated supporting means, which in this case is a single further elongated supporting means 204, are rollers 202-204 that create a bypass for the conveyor belt 102. The diameter of the further roller 204 is preferably larger than that of the adjacent rollers 202, 203.

The cutting apparatus in this embodiment further comprises an elongated bar 1000 arranged below the surface level of the conveyor belt 102 between the further elongated supporting means 204 and the cutter 103 and extends across the conveyor belt, e.g. between said common frame structure. In that way, the internal arrangement between the bar 1000 and the rollers 202-204 is fixed meaning that the bar 1000 moves back and forth as the rollers 202-204 are moved back and forth.

As depicted in this embodiment, the bar is a tube 1000 with a slot 1004 extending along the longitudinal axis of the tube 1000 where the slot is facing the cutting plane of the cutter 103 at all times. The tube may be open at its opposite end or partly open so as to let the water 1001 that accumulates in the tube to flow out of the tube.

Assuming the cutter 103 is a water cutter, the water beam 1003 hits the slot and thus the accumulated water, which results in that the impact from the water beam 1003 becomes absorbed or depleted by the tube or by the water accumulated within the tube. In that way, the conveyor belt will in no way be damaged during the cutting procedure. The tube 1000 may in addition to this easily be replaced with a new one when due to e.g wear. Thus, a cost saving solution is provided since it is more economical to replacing the tube 1000 with a new once, instead replacing the roller 204.

It should be noted that the elongated bar 1000 should not be construed to the tube shown here but other shapes of elongated bars may be used suitable for absorbing the cutting impact from the beam so as to prevent the belt from being damaged. The shapes, material type, thickness etc. of the elongated bar may also depend on the type of the cutter being used.

FIG. 12a,b depicts two different embodiments of said adjacent elongated supporting means, where FIG. 12a shows the embodiment that has been discussed in relation to FIGS. 2-11, where the adjacent elongated supporting means are rollers 202, 203 as well as the further elongated supporting means 204, that create a bypass for the conveyor belt 102.

FIG. 12b shows an embodiment where the adjacent elongated supporting means are triangular shaped bars 2002, 2003 where the acute angles of the triangular shaped bars are facing each other. As the figures show, the active distance 1201 between the adjacent rollers 202,203 in FIG. 12a, i.e. the distance where the planar surface of the conveyor belt 102 starts to deviate from the planer surface, is larger compared to the active distance 1201 in FIG. 12b between the adjacent triangular shaped bars 2002, 2003. Thus, in case the food items are relatively short, it may be preferred to use such triangular shaped bars 2002, 2003.

Figure 14:
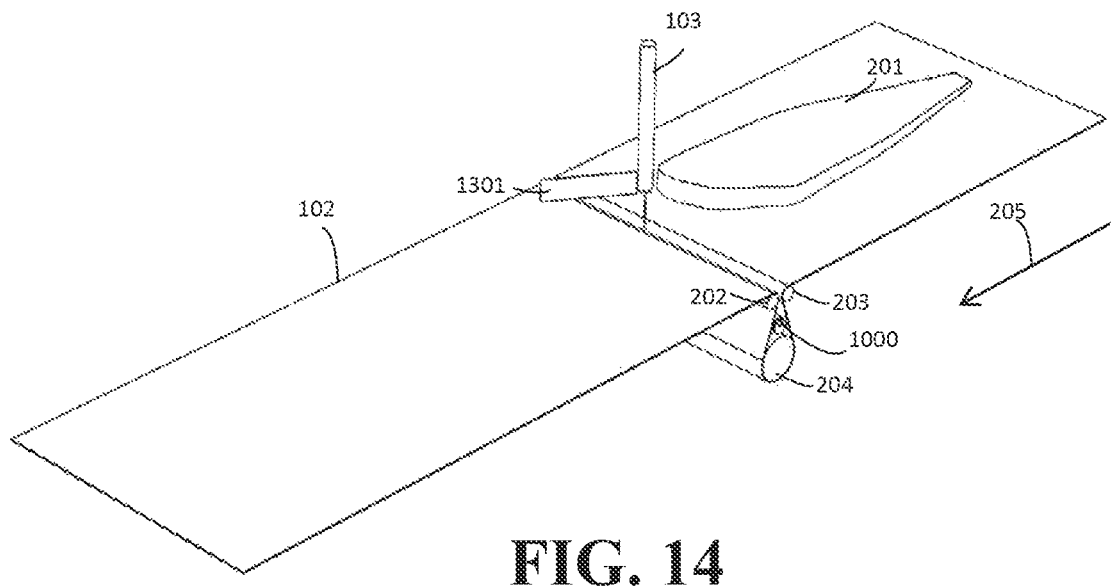
Figure 15:
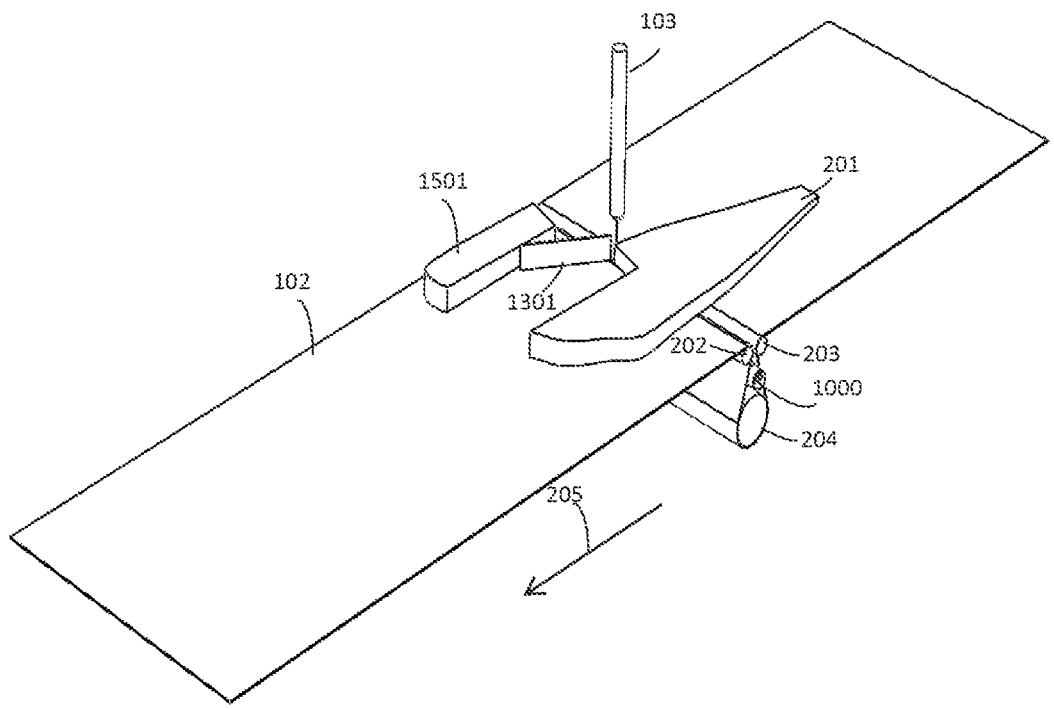

FIGS. 13-15 shows a perspective view of an embodiment of the apparatus according to the present invention further comprising a scraper 1301 adapted to remove cut out pieces of the food items after the cutting. The embodiment shown here further comprises said elongated bar 1000, but this embodiment obviously applies also to the embodiment in the absence of this elongated bar 1000.

The scraper 1301 may be mounted to the cutter 103 or the track 105 (see FIG. 1), but preferably so that the scraper 1301 follows the cutter 103 at all times, e.g. by rigidly mounting the scraper to the cutter with a pre-fixed angle. The scraper may also be mounted to a scraper operating mechanism (not shown here) that is capable of lifting the scraper 1301 up, as shown in FIG. 14, and down, as shown in FIG. 13, via e.g. air jack mechanism, depending on whether the scraper is 1301 is being used or not.

In one embodiment, the scraper operating mechanism is also capable of adjusting the angle of the scraper via vertical rotational axis, depending on whether a portion of the right or left side of the fish fillet 201 (food item) is being cut and subsequently removed. As shown here, the distal end of the scraper 1301 points towards the distal end of the conveyor belt 102.

FIG. 15 shows where the loins 1501 of the fish fillet has been cut and subsequently removed from the fish fillet. Accordingly, no extra manpower is needed to manually remove the cut out portion.

As an example, if the food item is pork belly, the scraper 1301 is of particular advantage when being utilized to remove the trim of the pork belly at the opposite sides of the pork belly. In such cases, the above mentioned angle of the scraper 1301 would be changed in accordance to e.g. images taken of the pork belly indicating which of the sides of the pork belly is being processed. This will be discussed in more details in relation to FIG. 19.

Figure 16:
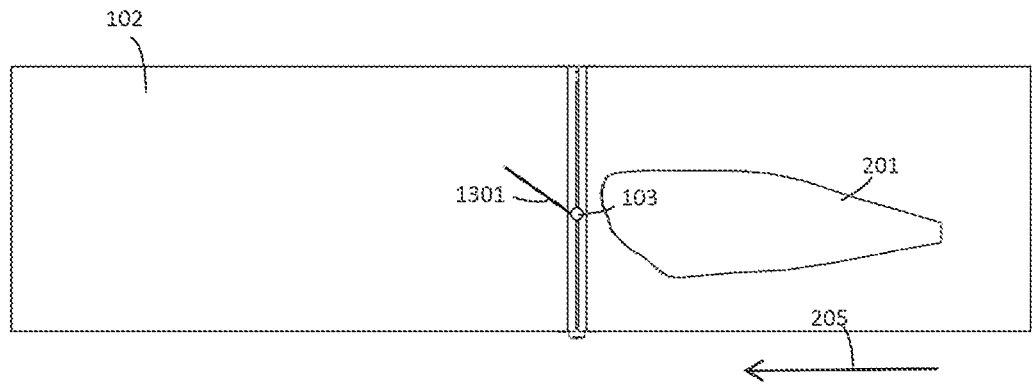
FIGS. 16-18 depict a top view of the embodiment shown in FIGS. 13-15, where FIG. 16 shown the scenario shortly before cutting the loins of the fish fillet.
Figure 17:
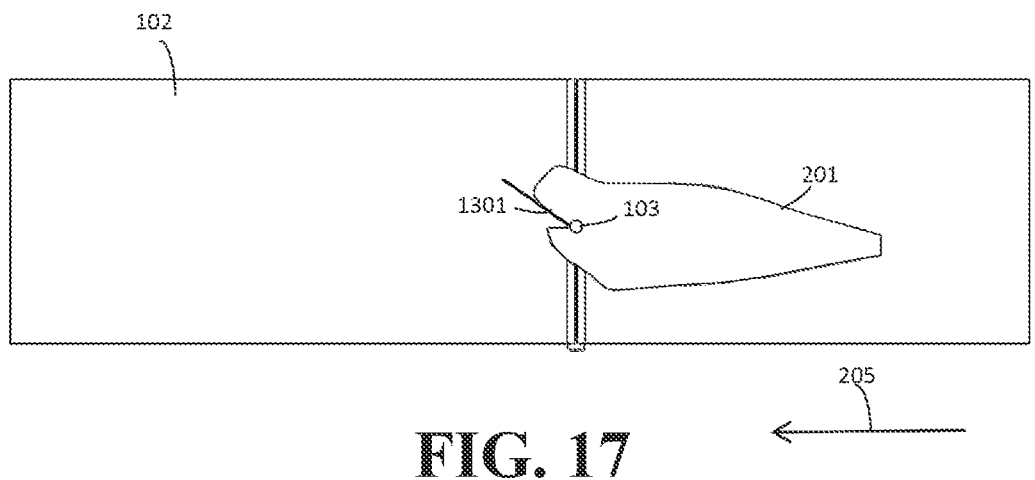
Figure 18:
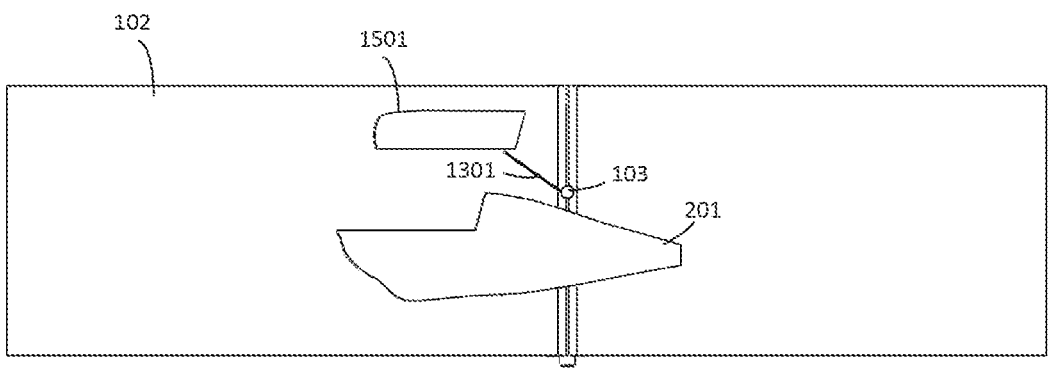

FIG. 16-18 depict a top view of the embodiment shown in FIGS. 13-15, where FIG. 16 shows the scenario shortly before cutting the loins 1501 of the fish fillet 201, FIG. 17 depicts the scenario during the cutting, showing clearly that the scraper 1301 is attached or associated to the cutter 103 at all times. As shown in this embodiment, the scraper 1301 is positioned adjacent and behind the cutter 103, i.e. at the downstream end with respect to the conveying direction 205 of the conveyor belt 102 so as to allow immediate removal of the loins 1501 (i.e. the cut out piece). However, the scraper 1501 may just as well be placed further down the conveying direction 205 and thus remove the cut out portions somewhat compared to the embodiment shown here.

FIG. 18 shows where the loins 1501 of the fish fillet has been removed from the fish fillet.

Figure 19:
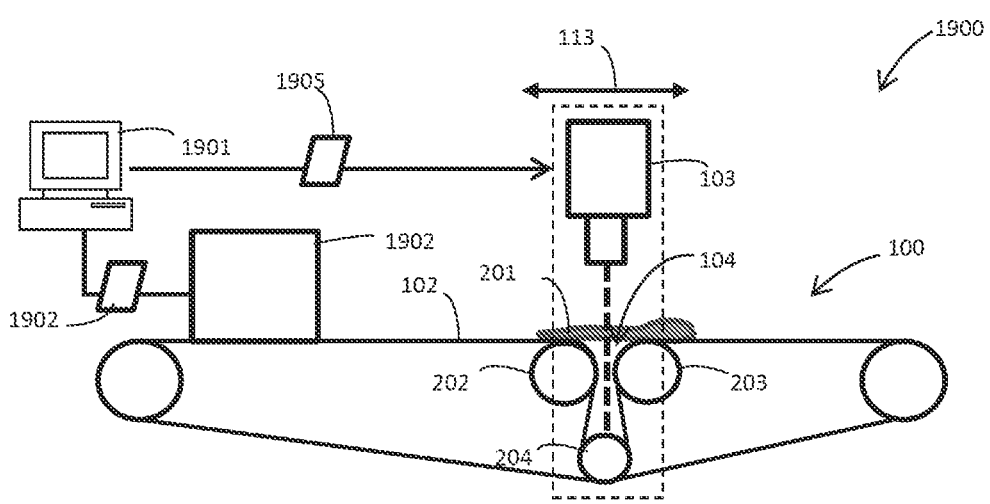
FIG. 19 shows one embodiment of a food processing system according to the present invention comprising the cutting apparatus as discussed in relation to FIGS. 1-18,
FIGS. 20-25 depict a perspective view, a top view and a side view of another embodiment of a cutting apparatus according to the present invention.

FIG. 19 shows one embodiment of a food processing system 1900 according to the present invention comprising the cutting apparatus 100 as discussed in relation to FIGS. 1-12. The food processing system 1900 comprises an imaging system 1902 and a computer system 1901. The imaging system may be, but is not limited to, a light source placed above the conveyor belt for imaging said food items and based thereon produce data identifying said undesired objects, or a three dimensional imaging equipment, or a color vision, or a x-ray system, or an ultraviolet system, or a combination of one or more of the above. Assuming that the imaging system is x-ray system, the resulting imaging data are x-ray data of the food items to be processed, in this case said fish fillet 201. The computer system 1901 is operable connected to a tracing mechanism (not shown), such as a tacho meter, for tracing the position of the fish fillet 201 while being conveyed. The computer system 1901 is further adapted to process the image data 1903 and generate operation parameters 1905 for operating said movement of the cutter 103 across the conveyor belt 102 and parallel to the conveying direction as indicated by the arrow 113. The operation parameters 1905 may further contain information indicating e.g. whether said scraper should be in an "active" mode adjacent to the conveyor belt (see FIGS. 13-18), and/or whether angle direction of the scraper, and/or the angle of the scraper.

In one embodiment, the imaging system includes a further x-ray system (not shown) positioned subsequent to cutting the food items adapted to image the processed food items. The computer system 1901 is also adapted to process this image data, e.g. x-ray data, for determining whether undesired objects are present in the processed food items, e.g. bones or small metal pieces. These food items may then subsequently be rejected.

In another embodiment, the x-ray system includes a first x-ray beam for radiating the food items from a first viewing angle, e.g. from above or below, for generating first view xray image data, and a second x-ray beam for radiating the food items from a second viewing angle, e.g. from the side, for generating a second view x-ray image data. The image data are then processed for generating three dimensional image data based of said items.

The imaging system, in this case the x-ray system, may be a dual energy system, meaning that the x-ray radiation uses two frequencies, where the attenuation of the radiations, e.g. the two frequencies when passing the products are measured and detected. However, also x-ray radiation systems with a single energy/frequency can be used for this purpose, for example when the height/thickness of the products are even or when the products are formed to have a substantially uniform thickness.

Figure 20:
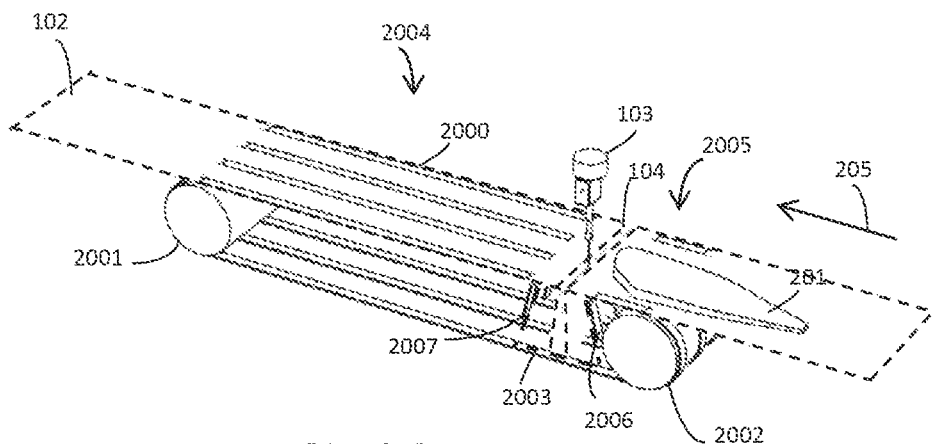
Figure 21:
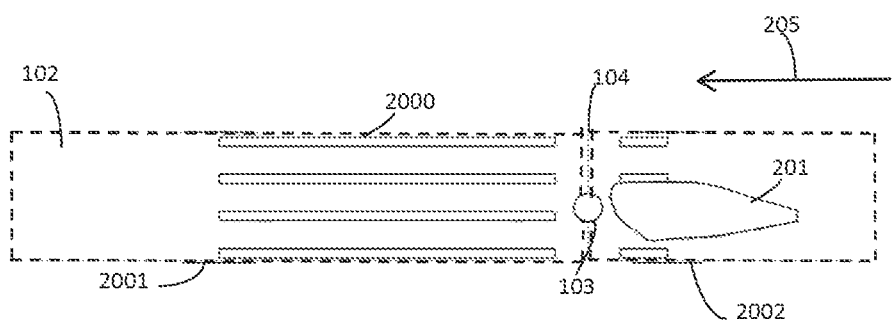
Figure 22:
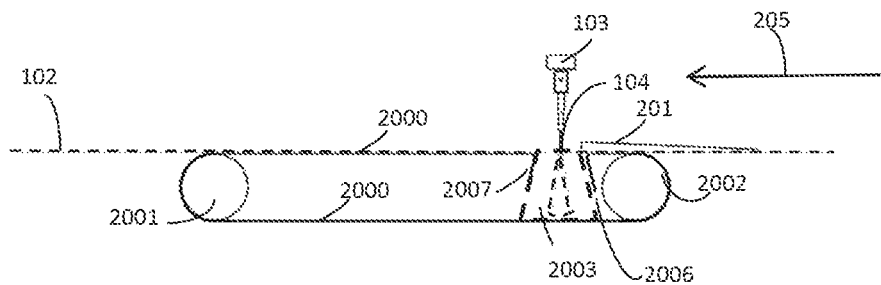

FIGS. 20-22 depict a perspective view, a top view and a side view of another embodiment of a cutting apparatus 100 according to the present invention. The cutting apparatus shown here further comprises at least one supporting means 2000 for supporting said belt 201. In this embodiment, the at least one supporting means is a supporting belt that extends between a first roller means 2001 and a second roller means 2002. As will be discussed in more details later the at least one supporting belt is fixed to a frame structure 2003 that supports said adjacent elongated supporting means 202, 203 and said further elongated supporting means 204. At least one of the roller means 2001,2002 acts as a driving roller for the frame structure 2003 via the at least one supporting belt and provides said back and forth displacement of the elongated supporting means 202-204 and the cutting means 103.

As shown, the at least one supporting belt 2000 is arranged adjacent and below said conveyor belt 102 and provides a support for the conveyor belt, i.e. the conveyor belt 102 lies on top of the at least one supporting belt 2000. For illustrative purposes the conveyor belt 102 is shown in dotted lines to educe the view of the at least one supporting belt 2000. The conveying direction of the food item, in this case a fish fillet 201, is indicated by the arrow 205.

The number of supporting belts shown here is four, but this number may vary from being only one supporting belt to two or more supporting belts, where the number of belts may e.g. depend on the width of the conveyor belt 102 or the type and/or weight of the food products. Also, in this embodiment, the four supporting belts 2000 extend around the first and second roller means 2001, 2002 where the distance between the upper and the lower horizontal sides of the supporting belts is greater that the depth of the V-shaped belt.

The ends 2006, 2007 of the four supporting belts 2000 are mounted to an upstream side 2005 and a downstream side 2004 of the frame structure 2003. As FIGS. 20 and 22 show, the first and the second ends 2007, 2006 of the four supporting belts 2000 extend upward and along the downstream and the upstream sides of the frame structure 2003 and around elongated bars (not shown here) to the first and second rollers 2001, 2002, respectively.

The at least one supporting belt may be made a timing belt which has a tooth shaped pattern and where the driving roller 2001, 2002 has a corresponding tooth shaped surface for engaging with the at least one tooth shape of the timing belt.

Figure 23:
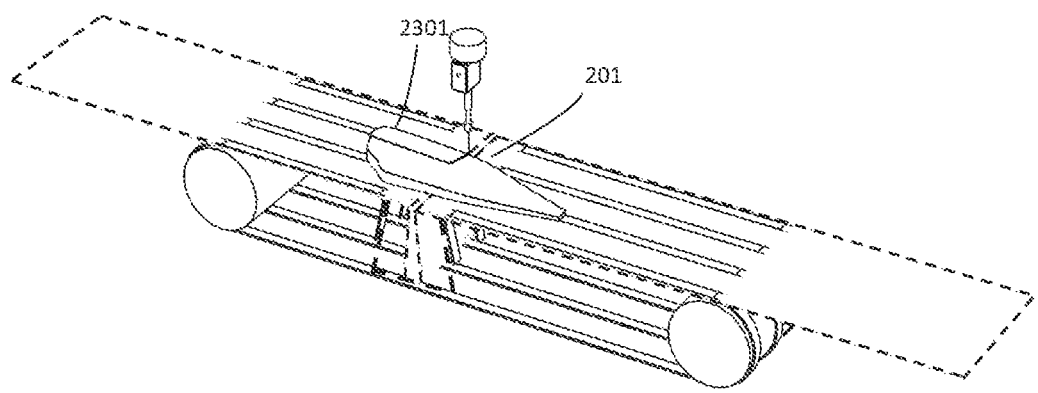
Figure 24:
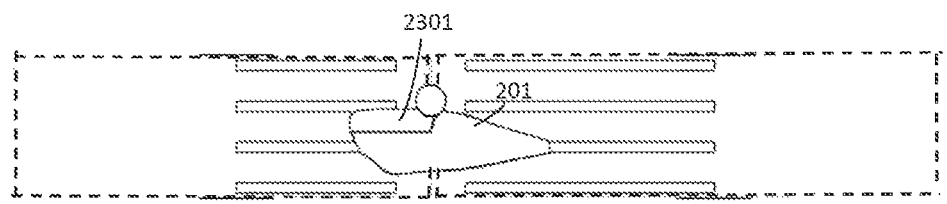
Figure 25:
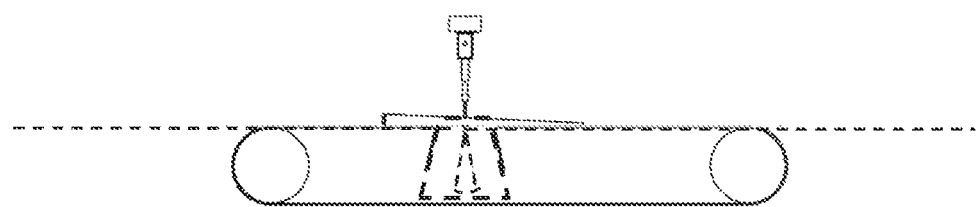

FIGS. 23-25 depict a perspective view, a top view and a side view of the same embodiment as shown in FIGS. 20-22, but at some later time point where the fish fillet 201 has been conveyed from the first position shown in FIGS. 20-22 towards a second position and where a portion 2301 of the fish fillet has been removed with the cutting means.

Figure 26:
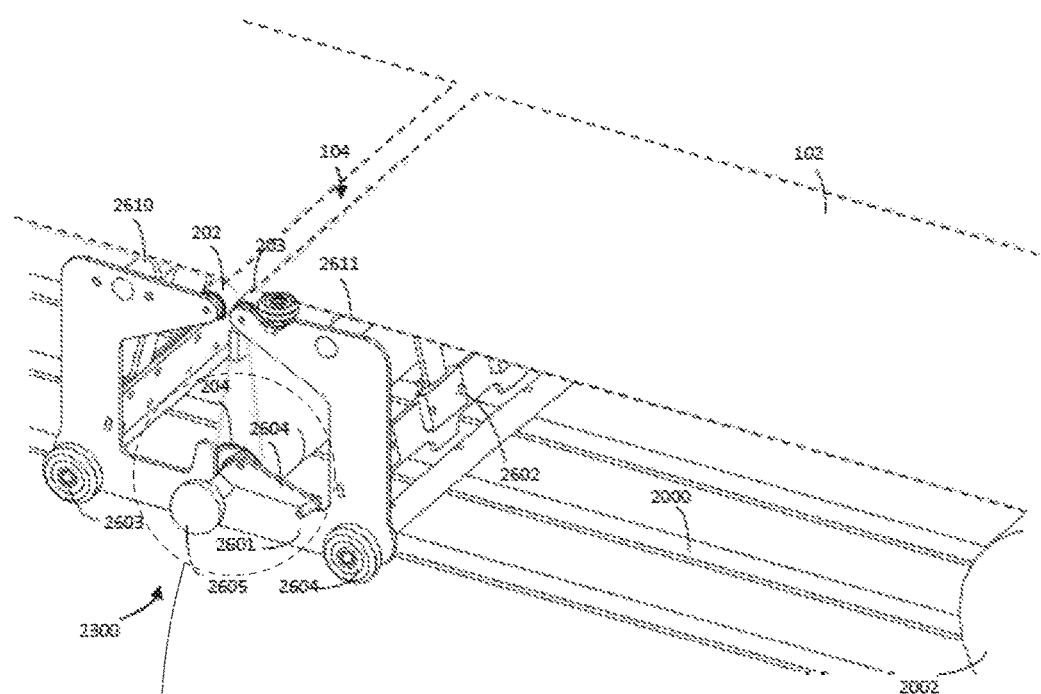
FIG. 26 shows one embodiment of means a frame structure associated with the cutting apparatus according to the present invention.
Figures 26A, 26B:
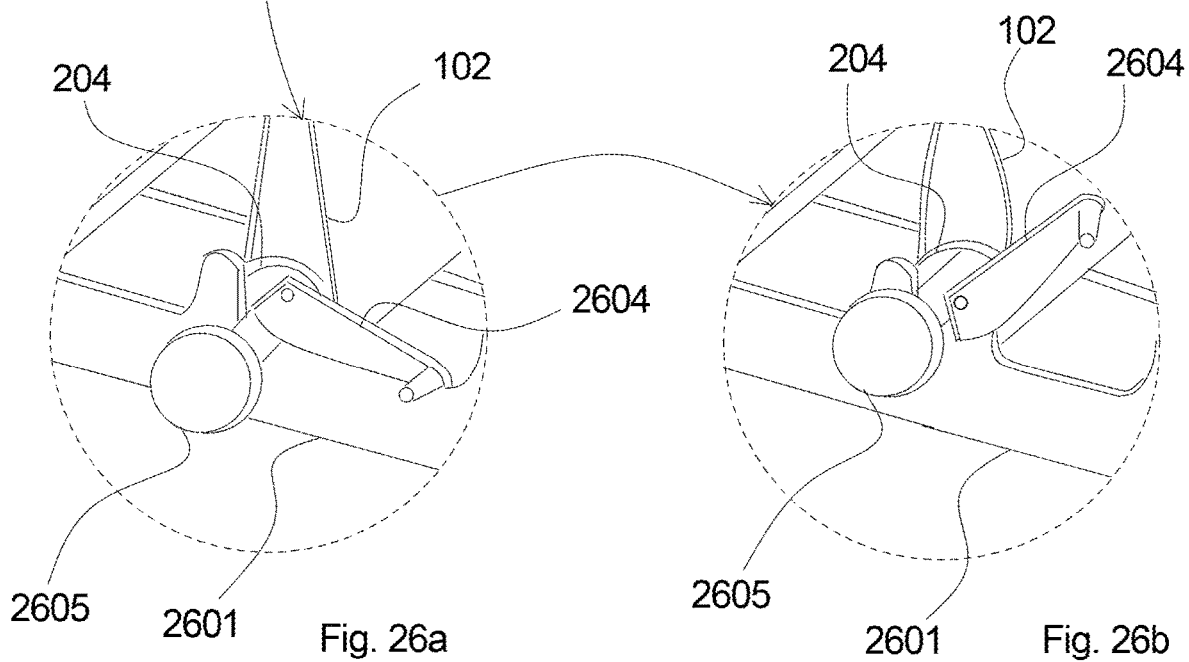
FIGS. 26a and 26b show close ups of a portion of the embodiment of the frame structure associated with the cutting apparatus of FIG. 26.

FIG. 26 shows one embodiment of said frame structure 2300 discussed in relation to FIGS. 20-25, where the frame structure comprises two opposite sides 2601 (the distal side is not shown). Said adjacent elongated supporting means 202, 203 is mounted to an upper part of the two opposite sides 2601 and said further elongated supporting means 204 is mounted to the lower part of the two opposite sides 2601. The internal arrangement between the adjacent elongated supporting means 202, 203 and the further elongated supporting means 204 is such that the vertical plane extending through the further elongated supporting means 204 is between the vertical planes extending through the adjacent elongated supporting means 202, 203. These elongated supporting means shown in this embodiment are guide rollers that rotate around an elongated rotation axis and act as idle rollers.

The frame structure further comprises a winch acting as a locking/un-locking mechanism 2604 for locking and unlocking the further elongated supporting means 204 by e.g. moving the winch 2604 from the horizontal position shown here where the further elongated supporting means 204 is in a locked position up to a horizontal position where the further elongated supporting means 204 is in an unlocked position. By doing so the further elongated supporting means 204 may be lifted upwards via the handle 2605 when e.g. removing the belt 102.

The mounting of the first and second ends 2006, 2007 of the supporting belts may as an example done by means of sliding the open ends into a pockets 2602 that e.g. clamp the open ends of the supporting belts in a fixed position, and extending the supporting belts 2000 upwards and around elongated bars 2610,2611 that are rigidly mounted to the frame structure towards said first and second roller means 2001, 2002, respectively.

Other means may also be provided for fixing the open ends of the supporting belts to the upstreamJdownstream sides of the frame structure.

The wheels 2603,2604 are adapted to slide on a sliding track (not shown here) for allowing said back and forth movement of the frame structure.

The cutting means may in relation to FIGS. 20-26 be mounted to the frame structure 2300 so that it follows the back and forth movement of the frame structure 2300 and also along a sliding track or similar means across the gap (not shown here), or the cutting means may run along and across separate sliding means along and/or across the gap 104 by be synchronized such that it is position above the gap at all times, i.e. independently from said frame structure 2300.

Figure 27:
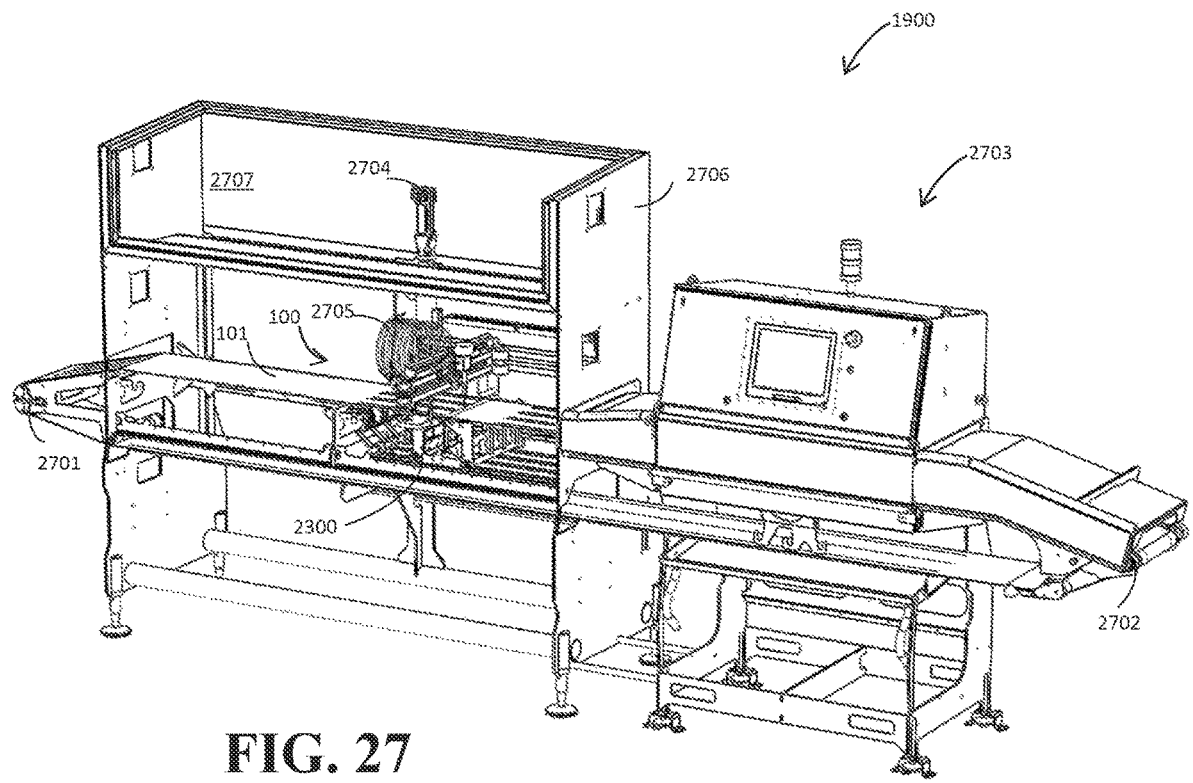
FIG. 27 shows another embodiment of a system according to the present invention.

FIG. 27 shows another embodiment of a system according to the present invention 1900. In this embodiment, the conveyor 101 further comprises a third roller means 2701 and a fourth roller means 2702 placed distally away from said first and second roller means 2001 of the cutting apparatus 100, where the third roller means act as a driving roller means for the conveyor belt 101. In this embodiment the cutting means may, but is not limited to, be a water jet cutter, but shown here is also a spiral shaped water inlet 2705 into the cutter, that is connected to a water source (not shown).

The cutting apparatus 100 is arranged within a frame 2706 but in this embodiment the size of the frame is large enough to contain another cutting apparatus (not shown) next to the cutting apparatus shown here. Moreover, the frame 2706 further includes an upper compartment 2707 to host the motor that drives the back and forth movement of the frame structure 2300.

Also, imaging equipment 2703 is shown, but this may e.g. be an X-ray apparatus for collecting data indicating e.g. the position of bones to be removed and/or undesired tissues, fat etc. but this data is used by a computer system/control unit (not shown) to operate the cutting means that removes the bones and/or the undesired tissues fat etc.

One and the same conveyor belt 101 is used throughout the system, i.e. from where the food items enter the imaging equipment until the food items have been processed by the cutting apparatus 100. This means that there is no need to use two different conveyor belts, i.e. one conveyor belt for the imaging equipment that conveys the food items into and through the imaging equipment and another cutting belt when cutting the food items with the cutting means.

Figure 28:
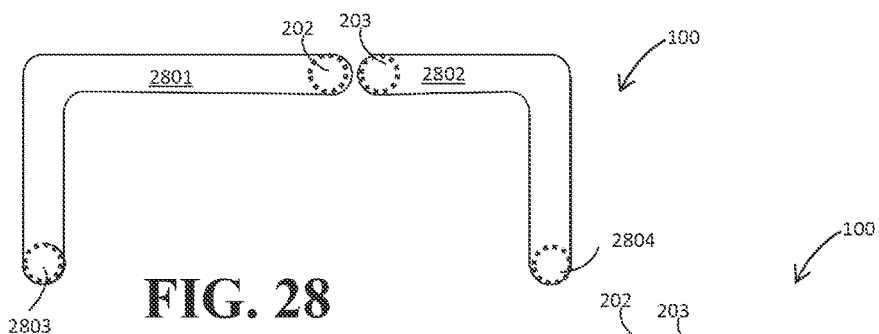
FIGS. 28 and 29 show another embodiment of a cutting apparatus according to the present invention for cutting food items conveyed on a conveyor but instead of utilizing only a single conveyor belt two adjacent conveyor belts are used.
Figure 29:
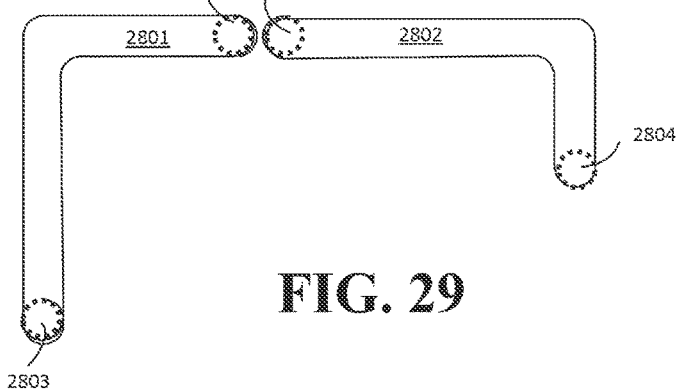

FIGS. 28 and 29 depict another embodiment of a cutting apparatus 100 according to the present invention for cutting food items conveyed on a conveyor, but instead of utilizing only a single conveyor belt as discussed in relation to the previous figures and create a bypass for creating said gap, two adjacent conveyor belts 2801,2802 are used where said adjacent elongated supporting means 202,203 are distal end-rollers of two adjacent conveyor belts 2801, 2802. As depicted here, each of the conveyor belts 2801, 2802 is provided with a belt stretching mechanism that is connected to the opposite ends 2803, 2804 of the two conveyors 2801, 2802, that adjusts height of the opposite ends in dependence of the length of the horizontal part of the conveyors such that the belt tension of the conveyor belt remains substantial constant at all times. These opposite ends may e.g. be idle rollers. FIGS. 28 and 29 show the adjacent ends 202, 203 of the cutting apparatus 100 in two different positions, where FIG. 28 shows the adjacent elongated supporting means 202, 203 are more to the right compared to FIG. 29 and where the opposite end 2803 is moved downward whereas the opposite end 2804 moved upward.

Any type of means (not shown) may be placed below the gap, especially in case the cutting means is a water jet, to take the impact from e.g. the water jet. In case the cutting means is a cutting blade such means may not be needed.

Figure 30:
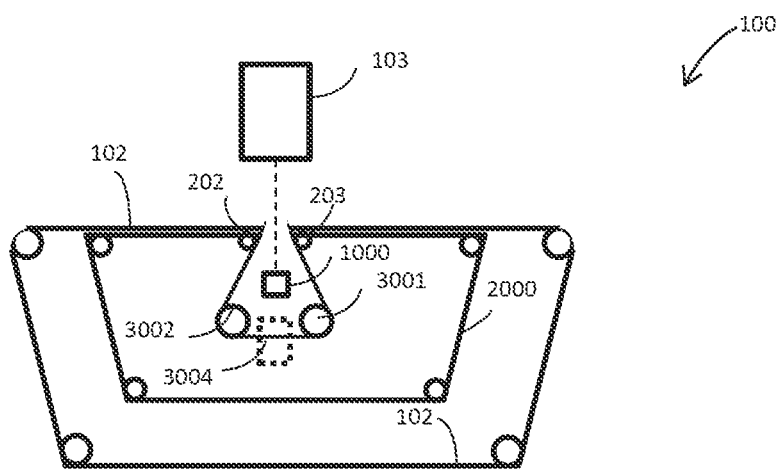
FIG. 30 shows yet another embodiment of a cutting apparatus according to the present invention.

FIG. 30 shows another embodiment of a cutting apparatus 100 according to the present invention where the at least one further elongated supporting means comprises two roller means 3001, 3002 instead of said single roller as shown in FIGS. 2-26. The space between the two roller means 3001, 3002 facilitates the removal of any undesired dirt, particles, tissues, bones, off-cut particles and the like from the processing, but it is important that such dirt/particles etc. do not land on the surface of the conveyor belt and become clamped between the belt 102 and the rollers 3001, 3002. The rollers 3001, 3002 might then push them hard to the belt 102 and therefore they might stick firmly to it.

A removing means 3004 may be provided at the space between the roller means 3001, 3002 for removing said undesired dirt/particles/off-cuts etc. that may fall down through the opening between the adjacent elongated supporting means 202, 203. This may as an example be, but is not limited to, a blowing devices that blows these away before the dirt becomes clamped between the conveyor belt and the rollers, a water jets, a suction mechanism and the like.

This embodiment shows also said elongated bar 1000 as discussed in relation to FIGS. 10 and 11, but this may especially be important if the cutting means is a water jet cutter, to prevent the cutting means from damaging the belt 102. In case the cutting means is a cutting blade or similar means such an elongated beam 1000 may not be needed.

Also, this embodiments shows where said at least one supporting belt 2000 extends between four rollers where at least one of these rollers are driving rollers for the adjacent elongated supporting means 202, 203 and the two roller means 3001, 3002, or the frame structure (not shown here) to which these adjacent elongated supporting means 202,203 and the two rollers 3001,3002 are mounted to. The number of rollers between which the at least one supporting belts 2000 extends should of course not be construed as being limited to these four rollers, but e.g. two rollers as discussed in relation to FIGS. 20-25 could just as well be possible.

The same applies to the number of rollers between which the conveyor belt extends between, but these rollers could just as well be two or more.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A cutting system for cutting food items of varying shape and size, the cutting system comprising:
    a single conveyor belt, the single conveyor belt being an endless conveyor belt configured to convey said food items, the single conveyor belt being a solid belt of a rubber or plastic material, the food items contacting the single conveyor belt at an upper surface level of the single conveyor belt;
    a cutter arranged above a gap that extends across the single conveyor belt, the cutter being a fluid pressure cutter, a laser beam cutter, or a high-pressurized gas cutter, the cutter being adapted for operating crosswise movement in a direction transverse to a conveying direction;
    an imaging system including an x-ray imaging system configured to image and produce x-ray image data of the food items to be processed while the food items are conveyed on said single conveyor belt;
    a support system including a first elongated support, a second elongated support, and a third elongated support,
        the second elongated support extending parallel to the first elongated support, the first elongated support and the second elongated support being arranged with a fixed arrangement relative to each other,
        the third elongated support being arranged below the first and second elongated supports,
        the third elongated support and the first and second elongated supports being positioned to create a bypass for the single conveyor belt by extending the single conveyor belt between the first and second elongated supports and around the third elongated support thereby defining the gap between the first and the second elongated supports, the gap extending across the single conveyor belt in the direction transverse to the conveying direction; and
    a control system including a computer system configured to receive input from the x-ray imaging system and output commands to the cutter and a control mechanism that controls movement of the support system;
    wherein the cutter is arranged above the gap such that a cutting path of the cutter continually extends into the gap, extending below a plane defined by the upper surface level of the single conveyor belt, such that the cutting path extends through the food items and the single conveyor belt is not contacted by the cutting path of the cutter,
    wherein the control system controls the cutter and first and second elongated supports to move back and forth in a direction parallel to the conveying direction while maintaining fixed the arrangement of the first and second elongated supports and the cutter, wherein the third elongated support is positioned such that the third elongated support intersects with a cutting plane of the cutter at all times and the cutter contacts the third elongated support.

2. The cutting system according to claim 1, wherein the cutter is a fluid pressure cutter and the pressure jet of the fluid pressure cutter contacts the third elongated support.

3. The cutting system according to claim 1, wherein the bypass forms a substantial U-shaped profile of the single conveyor belt by the single conveyor belt extending between the first and second elongated supports and the third elongated support.

4. The cutting system according to claim 1, wherein the cutting system controls the cutter and first and second elongated supports to move back and forth in the direction parallel to the conveying direction in a variable manner while maintaining fixed the arrangement of the first and second elongated supports and the cutter.

5. The cutting system according to claim 1, where the x-ray image data produced by the x-ray imaging system indicate position data of bones or undesired tissue to be removed from the food items.

6. The cutting system according to claim 1, wherein the computer system is adapted to process the x-ray image data, generate varying operation parameters for removal of the bones or undesired tissue from each of said food items, and operate said movement of the cutter across the single conveyor belt and parallel to the conveying direction in a variable manner based on said varying operating parameters for each of said food items while said single conveyor belt is conveying said food items to remove the bones or undesired tissue from each of said food items.

7. The cutting system according to claim 1, wherein the first and second elongated supports and the third elongated support each include a respective roller.

8. The cutting system according to claim 1, wherein the single conveyor belt extends between a first roller and a second roller.

9. The cutting system according to claim 1, wherein the first elongated support is arranged upstream of the gap and the second elongated support is arranged downstream from the gap.

10. The cutting system according to claim 9, wherein each of the first elongated support and the second elongated support have a first end mounted to a frame structure that maintains fixed the arrangement of the first and second elongated supports such that the first elongated support is mounted to an upstream side of the frame structure and the second elongated support is mounted to a downstream side of the frame structure.

11. The cutting system according to claim 1, further comprising a drive roller that drives said single conveyor belt.

12. The cutting system according to claim 1, wherein the first and second elongated supports each include a triangular-shaped bar, each of the triangular-shaped bars having an acute angle, and the acute angle of the triangular-shaped bar of the first elongated support facing the acute angle of the triangular-shaped bar of the second elongated support.

13. The cutting system according to claim 12, wherein each of the triangular-shaped bars are rounded along a corner edge defined by the acute angle.

14. The cutting system according to claim 1, wherein the third elongated support includes a tube with a slot extending along a longitudinal axis of the tube, wherein the tube is positioned such that the slot is facing the cutter and thus intersects with the cutting plane of the cutter at all times.

15. The cutting system according to claim 1, further comprising a scraper mounted to a scraper operating mechanism that moves the scraper down adjacent to the surface level of the single conveyor belt during cutting, and up from the surface level of the single conveyor belt when not in use.

16. The cutting system according to claim 15, wherein the scraper is positioned adjacent and behind the cutter at the downstream end with respect to the conveying direction of said single conveyor belt so as to allow immediate removal of cut out portions of said food items.

17. The cutting system according to claim 1, wherein the imaging system is configured to image the food items before and during cutting of the food items.

18. The cutting system according to claim 1, wherein the food items include a first food item, and wherein the imaging system is configured to image the first food item at the same time the first food item is being cut by the cutter.

19. The cutting system according to claim 1, wherein the third elongated support is equidistant from the first and second elongated supports.

20. The cutting system according to claim 1, wherein the first elongated support is a first roller, the second elongated support is a second roller, and the third elongated support is a third roller, and wherein a diameter of the third roller is larger than a diameter of the first roller and larger than a diameter of the second roller.

21. The cutting system according to claim 1, wherein the arrangement between the arrangement of the first and second elongated supports and the third elongated support forms a V-shaped profile that is oblique in relation to the upper surface level of the single conveyor belt.

22. The cutting system according to claim 1, wherein the third elongated support is a replaceable part configured to absorb the impact from the cutter.

23. The cutting system according to claim 1, wherein an axis of the third elongated support extends parallel to or within the cutting plane.

24. A method of cutting food items of varying shape and size with a cutting system according to claim 1, the method comprising:
conveying the food items in a conveying direction on the single conveyor belt;
producing the x-ray image data with the x-ray imaging system;
moving the cutter and first and second elongated supports back and forth in a direction parallel to the conveying direction while maintaining fixed the arrangement of the first and second elongated supports and the cutter;
cutting at least a portion of one of the food items with the cutter based on the produced x-ray image data.

25. A cutting system for cutting food items of varying shape and size, the cutting system comprising:
a single conveyor belt, the single conveyor belt being an endless conveyor belt configured to convey said food items, the single conveyor belt being a solid belt of a rubber or plastic material, the food items contacting the single conveyor belt at an upper surface level of the single conveyor belt;
a cutter arranged above a gap that extends across the single conveyor belt, the cutter being a fluid pressure cutter, a laser beam cutter, or a high-pressurized gas cutter, the cutter being adapted for operating crosswise movement in a direction transverse to a conveying direction;

an imaging system including an x-ray imaging system configured to image and produce x-ray image data of the food items to be processed while the food items are conveyed on said single conveyor belt;

a support system including a first elongated support, a second elongated support, and a third elongated support, the second elongated support extending parallel to the first elongated support, the first elongated support and the second elongated support being arranged with a fixed arrangement relative to each other, the third elongated support being arranged below the first and second elongated supports, the third elongated support and the first and second elongated supports being positioned to create a bypass for the single conveyor belt by extending the single conveyor belt between the first and second elongated supports and around the third elongated support thereby defining the gap between the first and the second elongated supports, the gap extending across the single conveyor belt in the direction transverse to the conveying direction; and a control system including a computer system configured to receive input from the x-ray imaging system and output commands to the cutter and a control mechanism that controls movement of the support system;

wherein the cutter is arranged above the gap such that a cutting path of the cutter continually extends into the gap, extending below a plane defined by the upper surface level of the single conveyor belt, such that the cutting path extends through the food items and the single conveyor belt is not contacted by the cutting path of the cutter, wherein the control system controls the cutter and first and second elongated supports to move back and forth in a direction parallel to the conveying direction while maintaining fixed the arrangement of the first and second elongated supports and the cutter, wherein the third elongated support is adjustable from being in a closed position such that the third elongated support is placed in a lowest position in relation to the first and second elongated supports and the single conveyor belt is in a stretched state and in an open position where the single conveyor belt is in a slack state.

* * * * *